(12) United States Patent
Pering et al.

(10) Patent No.: US 8,107,879 B2
(45) Date of Patent: Jan. 31, 2012

(54) DEVICE, SYSTEM, AND METHOD OF ESTABLISHING MULTIPLE WIRELESS CONNECTIONS

(75) Inventors: Trevor Pering, San Francisco, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 11/967,331

(22) Filed: Dec. 31, 2007

(65) Prior Publication Data

US 2009/0170431 A1    Jul. 2, 2009

(51) Int. Cl.
*H04B 5/00* (2006.01)
(52) U.S. Cl. .................... 455/41.1; 455/39; 455/41.2
(58) Field of Classification Search ............. 455/39, 455/41.1, 41.2, 41.3
See application file for complete search history.

(56) References Cited

U.S. PATENT DOCUMENTS

| | | | |
|---|---|---|---|
| 7,228,108 B2 * | 6/2007 | Ayatsuka et al. | 455/73 |
| 7,598,704 B2 * | 10/2009 | Taniguchi et al. | 320/108 |
| 7,600,005 B2 * | 10/2009 | Jamkhedkar et al. | 709/220 |
| 2006/0052055 A1 * | 3/2006 | Rowse et al. | 455/41.1 |
| 2010/0079260 A1 * | 4/2010 | Kiesel et al. | 340/10.51 |

* cited by examiner

*Primary Examiner* — Tuan H Nguyen
(74) *Attorney, Agent, or Firm* — Kacvinsky Daisak, PLLC

(57) ABSTRACT

Device, system, and method of establishing multiple wireless connections. For example, a system includes: a tag to store wireless connection information readable by a mobile device, the wireless connection information including: a first connection information item including data to support establishment of a first wireless communication link between the mobile device and a first wireless device; and a second connection information item including data to support establishment of a second wireless communication link between the mobile device and a second wireless device.

15 Claims, 3 Drawing Sheets

DEVICE, SYSTEM, AND METHOD OF ESTABLISHING MULTIPLE WIRELESS CONNECTIONS

BACKGROUND

A user may utilize a laptop computer to perform various activities (e.g., word processing, photograph editing, or the like) while the user is traveling or is away from his home or office. Once the user is back at his home or office, the user may connect the laptop computer to a set of peripherals, for example, a display unit, a set of speakers, a full-size keyboard, and a full-size mouse), in order to perform these or other activities using a richer set of peripherals and Input/Output (I/O) components.

Unfortunately, the connection process may be time consuming and effort consuming: for example, the user may be required to physically connect cables between the laptop computer and each one of the multiple peripherals. Alternatively, the user may utilize a docking station, which may facilitate a pre-defined connection of the laptop to a substantially constant set of multiple peripherals.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
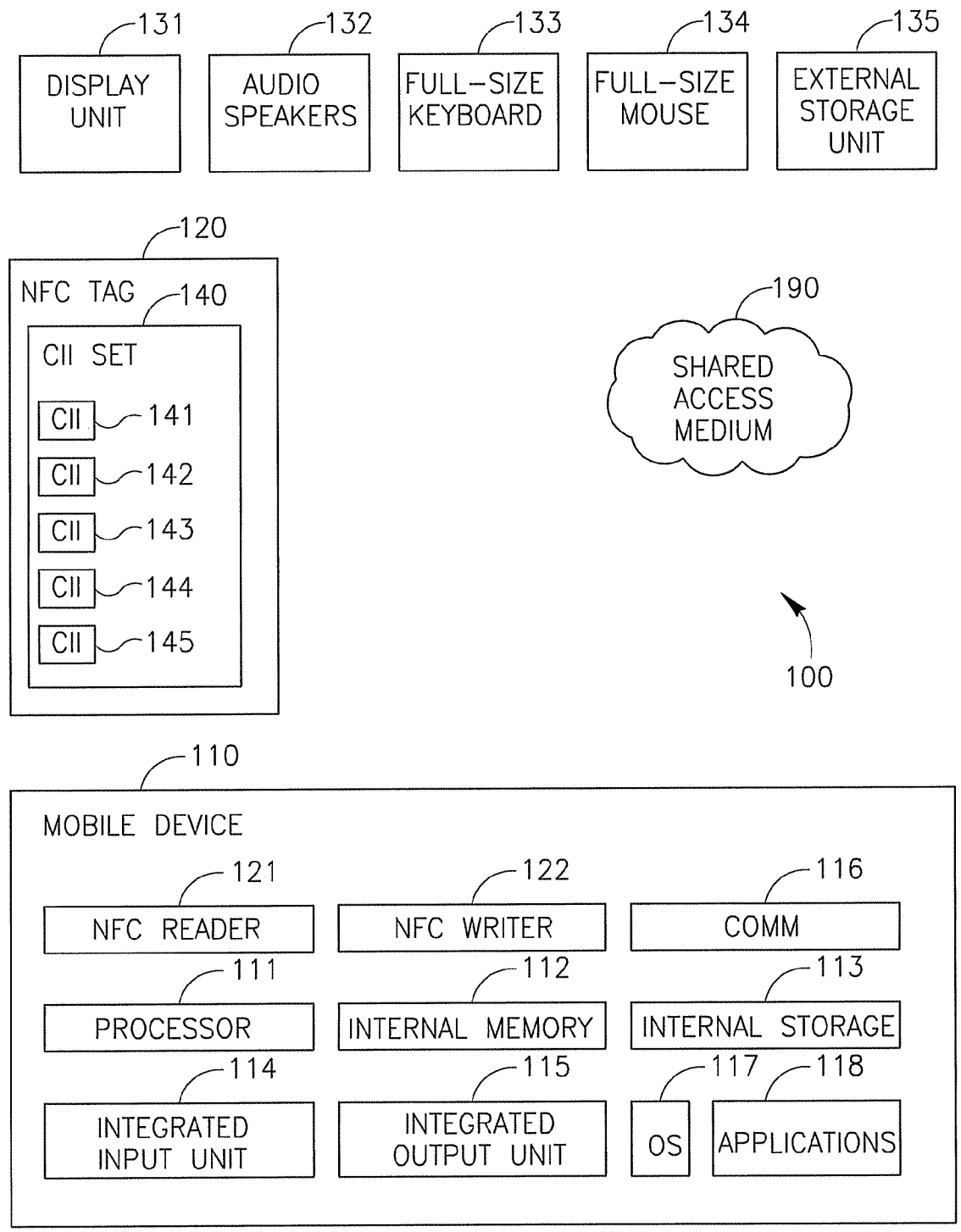
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, ZigBee (TM), Ultra-Wideband (UWB), Global System for Mobile communication (GSM), 2 G, 2.5 G, 3 G, 3.5 G, Enhanced Data rates for GSM Evolution (EDGE), or the like. Embodiments of the invention may be used in various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

FIG. 1 schematically illustrates a block diagram of a system 100 in accordance with some demonstrative embodiments of the invention. System 100 includes, for example, a mobile device 110 and a Near Field Communication (NFC) tag 120 (e.g., located externally to the mobile device 110. System 100 further includes one or more components located externally to the mobile device 110, for example, a display unit 131, one or more audio speakers 132, a full-size or stand-alone keyboard 133, a full-size or stand-alone mouth 134, and an external storage unit 135. Components of system 100 may communicate using wired or wireless links, for example, through a wireless shared access medium 190.

Mobile device 110 includes, for example, a laptop computer, a notebook computer, a tablet computer, a PDA device, a cellular phone, a mobile phone, a hybrid device (e.g., combining cellular phone functionalities with PDA device functionalities), a relatively small computing device, a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Mobile device 110 includes, for example, a processor 111; an internal memory unit 112 (e.g., Random Access Memory (RAM)); an internal storage unit 113 (e.g., a hard disk drive); an integrated input unit 114 (e.g., a screen integrated within the housing or body of the mobile device 110); an integrated output unit 115 (e.g., a keyboard and a touch-pad integrated within the housing or body of the mobile device 110); a communication unit 116 (e.g., one or more transceivers and/ or antennas); an Operating System (OS) 117; and one or more applications 118.

Mobile device 110 further includes a NFC reader 121 able to read data stored in the NFC tag 120. Mobile device 110 optionally includes a NFC writer 122 able to write data onto the NFC tag 122, or to otherwise modify data stored on the NFC tag 120.

Devices 131-135 may have wireless communication capabilities. In some embodiments, for example, each one of devices 131-135 may be able to communicate with mobile device using one or more wireless communication links, e.g., IEEE 802.11 communication, IEEE 802.16 communication, Bluetooth communication, Ultra WideBand (UWB) communication, or the like.

NFC tag 120 may include a readable tag or element for short range one-way or two-way wireless communication. NFC tag 120 includes, for example, a one-way NFC tag or element, a two-way NFC tag or element, a NFC transponder, a NFC chip, a chipless NFC object, a NFC Integrated Circuit (IC), a passive NFC tag or element, an active NFC tag or element, a semi-passive or battery-assisted NFC tag or element, a RFID tag or element, a one-way RFID tag or element, a two-way RFID tag or element, a RFID transponder, a RFID chip, a chipless RFID object, a RFID Integrated Circuit (IC), a passive RFID tag or element, an active RFID tag or element, a semi-passive or battery-assisted RFID tag or element, a barcode, a scan-able graphical element, a scan-able string of characters, a scan-able pattern, a read-only tag or element (e.g., pre-provided with information written or hard-coded by a manufacturer), a write-once read-many tag or element (e.g., allowing a one-time writing onto the tag or element), a readable tag or element, a writeable or re-writeable tag or element, a readable/writeable tag or element, a read/write tag or element, a tag or element having a memory unit, a tag or element having a readable and/or writeable memory unit, or the like. The NFC tag 120 may optionally include, or may be associated with, one or more antennas, circuits, transponders, or other suitable units. Although portions of the discussion herein relate, for demonstrative purposes, to NFC communication and/or to NFC tags, embodiments of the invention may be used in conjunction with other types of communication and/or tags.

In some embodiments, the NFC tag 120 may store a relatively small amount of data (e.g., under 256 bytes, under one kilobyte, under two kilobytes, or the like). The data stored in the NFC tag 120 may be wirelessly read or optically scanned by the NFC reader 121 of mobile device 110 utilizing short-range Radio Frequency (RF) communication, for example, when the mobile device 110 is in near-field proximity to the NFC tag 120 (e.g., under 10 centimeters, under one foot, under 50 centimeters, or the like).

In some embodiments, NFC reader 121 may read data from NFC tag 120 using contactless communication, for example, once the mobile device 110 is in near-field proximity to the NFC tag 120. In other embodiments, NFC reader 121 may read data from NFC tag 120 using touch-based communication, for example, once the mobile device 110 touches the NFC tag 120. In still other embodiments, NFC reader 121 may read data from NFC tag 120 upon a scanning operation; for example, the user of mobile device 110 utilizes an optical scanner (e.g., similar to a barcode scanner) to scan the NFC tag 120 or a portion thereof.

Similarly, in some embodiments, NFC writer 122 may write data to NFC tag 120 using contactless communication, for example, once the mobile device 110 is in near-field proximity to the NFC tag 120. In other embodiments, NFC writer 121 may write data to NFC tag 120 using touch-based communication, for example, once the mobile device 110 touches the NFC tag 120. In still other embodiments, NFC reader 121 may write data to NFC tag 120 upon a scanning operation; for example, the user of mobile device 110 utilizes an optical scanner (e.g., similar to a barcode scanner) to scan the NFC tag 120 or a portion thereof. In some embodiments, NFC writer 122 may be located externally to mobile device 110, for example, as part of another mobile device, as part of a non-mobile device, as a separate or stand-alone tag writer device or tag editor device, or the like.

The NFC tag 120 may include one or more Connection Information Items (CIIs), for example, CIIs 141-145, including information to support or to allow the automatic establishment of a connection between the mobile device 110 and one of devices 131-135, and/or including information regarding the establishment of multiple connections among the mobile device 110 and some or all of devices 131-135. Each CII 141-145 includes, for example, a wireless Media Access Control (MAC) address of the corresponding device 131-135; a device Global Unique Identifier (GUID) that allows a service to be contacted over a wired or wireless network; a network IP address of the corresponding device 131-135; a Universal Plug and Play (UPnP) GUID of the corresponding device 131-135; a property, a physical property or a logical property of the corresponding device 131-135 (e.g., display size, memory size, color depth, resolution, or the like); or other suitable information.

For example, CII 141 includes information or machine-readable instructions indicating how to automatically establish a wireless connection between mobile device 110 and display unit 131, or vice versa. CII 142 includes information or machine-readable instructions indicating how to automatically establish a wireless connection between mobile device 110 and audio speakers 132, or vice versa. CII 143 includes information or machine-readable instructions indicating how to automatically establish a wireless connection between mobile device 110 and full-size keyboard 133, or vice versa. CII 144 includes information or machine-readable instructions indicating how to automatically establish a wireless connection between mobile device 110 and full-size mouse 134, or vice versa. CII 145 includes information or machine-readable instructions indicating how to automatically establish a wireless connection between mobile device 110 and external storage unit 135, or vice versa. Optionally, CIIs 141-145 may be packaged or included in a CII set 140.

In order to automatically connect the mobile device 110 to multiple devices 131-135, the mobile device 110 is placed in near-field proximity to the NFC tag 120. The NFC tag reader 121 of mobile device 110 reads the CII set 140 stored in the NFC tag 120, or reads the multiple CIIs 141-145 stored in the NFC tag 120. The mobile device 110 utilizes the information within CII 141 in order to automatically establish a wireless connection between mobile device 110 and display unit 131. The mobile device 110 utilizes the information within CII 142 in order to automatically establish a wireless connection between mobile device 110 and audio speakers 132. The mobile device 110 utilizes the information within CII 143 in order to automatically establish a wireless connection between mobile device 110 and full-size keyboard 133. The mobile device 110 utilizes the information within CII 144 in order to automatically establish a wireless connection between mobile device 110 and full-size mouse 134. The mobile device 110 utilizes the information within CII 145 in order to automatically establish a wireless connection between mobile device 110 and external storage device 135.

The content of CIIs 141-145 may be inserted into CIIs 141-145 in various suitable methods. In some embodiments, NFC tag 120 may be manufactured or pre-provided using pre-programmed CIIs 141-145. In other embodiments, NFC tag writer 122 of mobile device 110 may be used to automatically write, rewrite, overwrite or otherwise modify the content of one or more CIIs 141-145. In still other embodiments, NFC tag writer 122 of mobile device 110 may be used to write, rewrite, overwrite or otherwise modify the content of one or more CIIs 141-145 in response to a user's command to modify the content, for example, utilizing a software application that allows the user to create or edit CII content or to configure or re-configure a system composition. In yet other embodiments, NFC tag 120 may include, or may be associated with, a logic circuit or a module able to automatically and/or independently determine and/or infer CII content, and then write the determined CII content into one or more CIIs in NFC tag 120. In some embodiments, a suitable component may instruct each of devices 131-135 to write its service ID information or its connection information (e.g., MAC address, IP address, GUID, or the like) into the NFC tag 120, for example, in sequence. Other suitable methods may be used.

In some embodiments, a single NFC tag 120 is thus utilized to specify multiple connections in order to conveniently create a system composition which includes multiple wireless devices. The composition process is based on placing or locating the mobile device in near-field proximity to the NFC tag 120, and does not require a physical connection of the mobile device 110 into a docking station or using one or more cables or wires. In some embodiments, placement of mobile device 110 in proximity to the NFC tag 120, or placing mobile device 110 to touch (continuously or instantaneously) with the NFC tag 120, or scanning the NFC tag 120 by the NFC tag reader 121 of mobile device 110, may suffice in order to automatically connect multiple devices 131-135 to mobile device 110.

Some embodiments utilize NFC to exchange information between two or more wireless devices that are touching or nearly touching. For example, the NFC tag reader 121 may scan the NFC tag 120 to obtain CIIs 141-145 which are then used for establishing wireless connections. The short-range characteristic of NFC allows connections to be uniquely specified, since mobile device 110 may be required to almost touch the NFC tag 120 in order to exchange information, thereby allowing a secure connection to be set up between the devices. In some embodiments, optionally, an indirection or lookup mechanism may be used to process the CIIs 141-145 stored in NFC tag 120.

Some embodiments allow the mobile device 110 to acquire, from a single NFC tag 120, the information required for forming multiple wireless connections with multiple wireless devices 131-135. Accordingly, a single NFC tag 120 encapsulates the information required for a "one-to-many" type of association or composition. By encapsulating multiple wireless services in a single NFC tag 120, the system 100 effectively creates a virtual docking station encapsulated within the NFC tag 120; reading or scanning the NFC tag 120 is the virtual substitute or the wireless substitute of placing the mobile device into a physical docking station.

In some embodiments the NFC tag 120 may store information to indirectly connect the mobile device 110 to multiple devices 131-135 and/or to multiple services. For example, the NFC tag 120 may store a MAC address or a URL pointing to an indirection service, which in turn points to multiple devices or services to which the mobile device 110 then automatically connects. Optionally, a suitable mechanism is used to configure the NFC tag 120 and/or the system 100 with the suitable data, for example, writing the configuration information to the NFC tag 120 beforehand, or providing the required information to the infrastructure of system 100, or commanding each device 131-135 in a proposed system composition to write its ID or service information into the NFC tag 120 (e.g., in sequence).

In some embodiments, multiple NFC tags 120 may be used in order to concisely represent information for composing multiple systems. For example, multiple NFC tags 120 are used to succinctly specify different system compositions using a subset of devices 131-135, for example, by assigning different compositions to different NFC tags 120. The different NFC tags 120 may store different configuration information in order to specify different components. For example, a first NFC tag may be used to store the composition of devices 131, 132 and 133; whereas a second NFC tag may be used to store the composition of devices 131, 132, and 134. Accordingly, the physical NFC tags 120 are used to assist users to specify and configure systems without requiring complex interactions.

Some embodiments thus combines multiple connection specifications into a single physical NFC tag 120. Instead of treating connections as individual entities, some embodiments collects the wireless connections into a unified composition which may then be used to streamline the overall interaction and to allow rapid and convenient creation of a logical platform or a composed system.

In some embodiments, the NFC tag 120 may include information indicating how to connect the mobile device 110 to one or more wireless Access Point (AP) and/or other wireless devices. Optionally, the NFC tag 120 may include Service Set Identifier (SSID) information, Extended Service Set Identifier (ESSID) information, Wired Equivalent Privacy (WEP) key information, or other suitable information with regard to multiple wireless devices or endpoints.

Some embodiments may utilize a centralized architecture, in which a single device (e.g., the mobile device 110) operates to both write information onto the NFC tag 120 and to read information from the NFC tag 120. Other embodiments may utilize a distributed architecture, in which a first device operates to write information onto the NFC tag 120, and a second, separate, device operates to read information from the NFC tag 120. In some embodiments, one or more devices may be able to write information onto the NFC tag 120, and one or more devices (e.g., the same devices and/or other devices) may be able to read information from the NFC tag 120. In some embodiments, for example, a first device may be placed in proximity to the NFC tag 120 in order to initialized the NFC tag 120; then, the NFC tag 120 may be placed in proximity to a second device, which in turn may further write composition information onto the NFC tag 120; then, the NFC tag 120 may be placed in proximity to a third device, which in turn may further write additional composition information onto the NFC tag 120; and so forth. Optionally, after multiple devices write information onto the NFC tag 120, the NFC tag 120 may be placed in proximity to the first device, thereby allowing the first device to wirelessly connect with the other multiple devices. Other suitable composition methods may be used.

Figure 2:
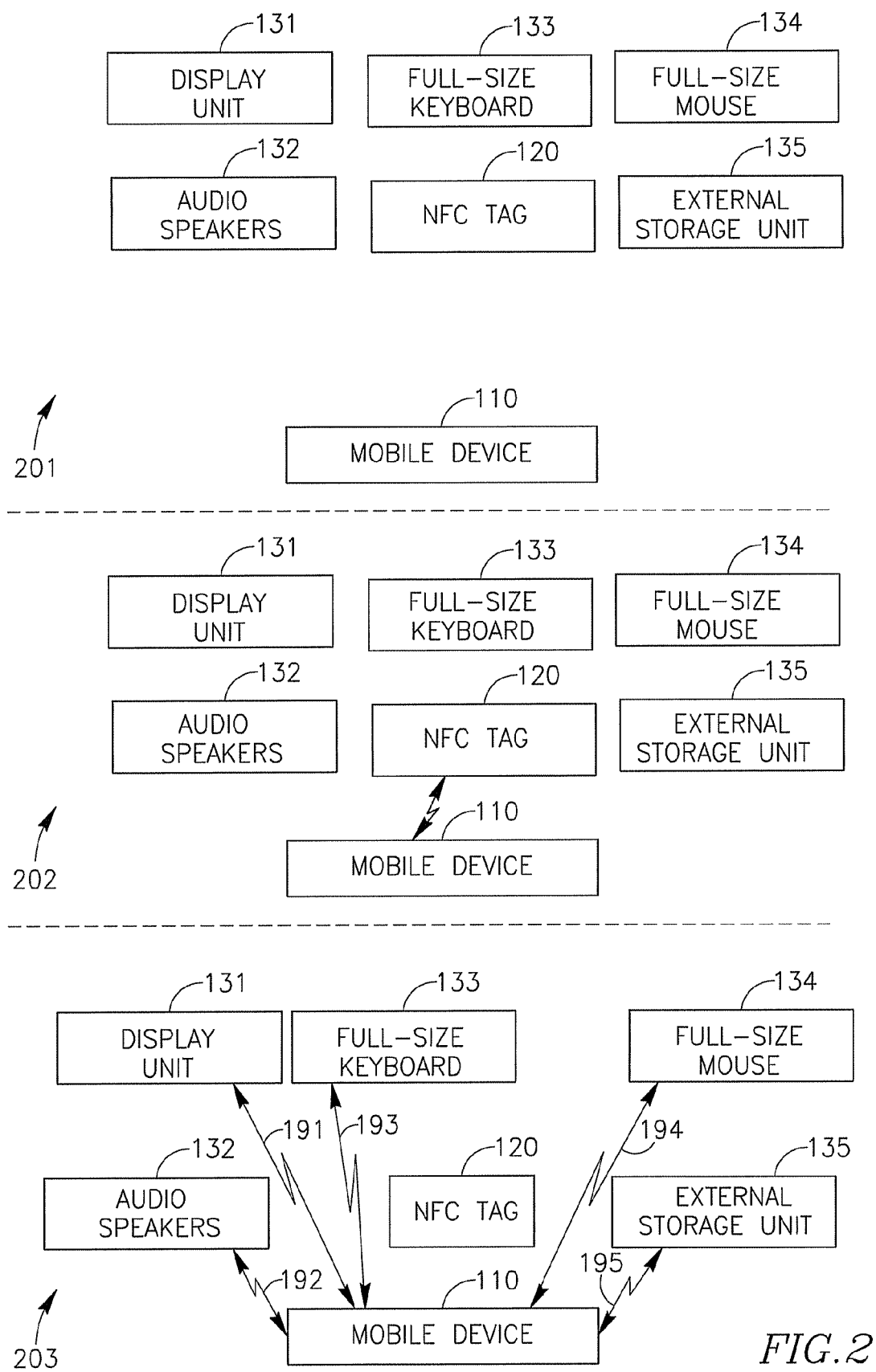
FIG. 2 is a schematic block diagram illustration of a multi-stage process of establishing multiple wireless connections in accordance with some demonstrative embodiments of the invention.

FIG. 2 schematically illustrates a block diagram of a multi-stage process of establishing multiple wireless connections in accordance with some demonstrative embodiments of the invention. For demonstrative purposes, the process of FIG. 2 is shown using three stages 201-203. The process of FIG. 2 is demonstrated using the components of FIG. 1.

As shown in stage 201, initially, mobile device 110 is not in near-field proximity to NFC tag 120. At this stage, mobile device 110 is not connected to other system components.

As shown in stage 202, mobile device 110 is placed in near-field proximity to NFC tag 120. At this stage, mobile device 110 reads or scans the NFC tag 120; for example, mobile device 110 obtains from the NFC tag 120 information (e.g., CIIs) indicating to mobile device that other wireless devices 131-135 are available for connection, as well as how to connect to these wireless devices 131-135.

As shown in stage 203, mobile device 110 utilizes the information read from the NFC tag 120 in order to establish multiple wireless connections (e.g., wireless links 191-195) with multiple wireless devices 131-135, respectively.

In some embodiments, wireless links 191-195 may be of various types and may have different properties. For example, wireless link 191 may be an IEEE 802.11 link, wireless link 192 may be an IEEE 802.16 link, wireless link 193 may be a Bluetooth link, and wireless link 194 may be a UWB link. For example, wireless link 193 between full-size keyboard 133 and mobile device 110 may be a uni-directional link (e.g., full-size keyboard 133 transfers data to mobile 110, whereas mobile device 110 does not transfer data to full-size keyboard 133); and wireless link 195 between external storage unit 135 and mobile device 110 may be a bi-directional link (e.g., external storage unit 135 transfers data to mobile device 110, and mobile device 110 transfers data to external storage unit 135). Links 191-195 may be established in parallel, in sequence, in series, in accordance with a pre-defined order, or the like.

In some embodiments, the NFC tag 120 need not be in near-field proximity (or in proximity) to one or more of devices 131-135. For example, devices 131-135 may be located in a common room; full-size keyboard 133 and full-size mouse 134 may be located on a table in the room; display unit 131 may be mounted on a wall in the room; audio speakers 132 may be located in room corners; external storage unit 135 may be located under the table or on the floor; and the NFC tag 120 may be located on the table, or on the entrance door to the room. The mobile device 110 may be placed on the table in order to read the NFC tag located on the table; or, the mobile device 110 may scan the NFC tag 120 located on the door upon entrance to the room.

In some embodiments, optionally, the scanning of the NFC tag 120 by the mobile device 110, as well as the exchange of information between the NFC tag 120 and the mobile device 110, may be separated in time from the establishment of wireless links 191-195 between the mobile device 110 and the wireless devices 131-135. For example, the reading of information from the NFC tag 120 by the mobile device 110 may be substantially instantaneous (e.g., may take one second, or may take under three seconds); whereas the establishment of wireless links 191-195 may be non-instantaneous, may include a handshake protocol, may include establishment of links 191-195 in sequence over a period of time (e.g., 30 seconds). In some embodiments, a user approval may be required subsequent to performing stage 202 and before the mobile device 110 performs stage 203.

In some embodiments, the mobile device 110 is in near-field proximity to the NFC tag 120 in stage 202, e.g., momentarily; whereas the mobile device 110 need not be in near-field proximity to the NFC tag 120 during stage 203, while the wireless links 191-195 are established. For example, mobile device 110 may be removed from its near-field proximity to NFC tag 120 during or after the establishment of wireless links 191-195 in stage 203. For example, the established wireless communication links are maintained operational after removal of the mobile device 110 from its near-field proximity to NFC tag 120.

Figure 3:
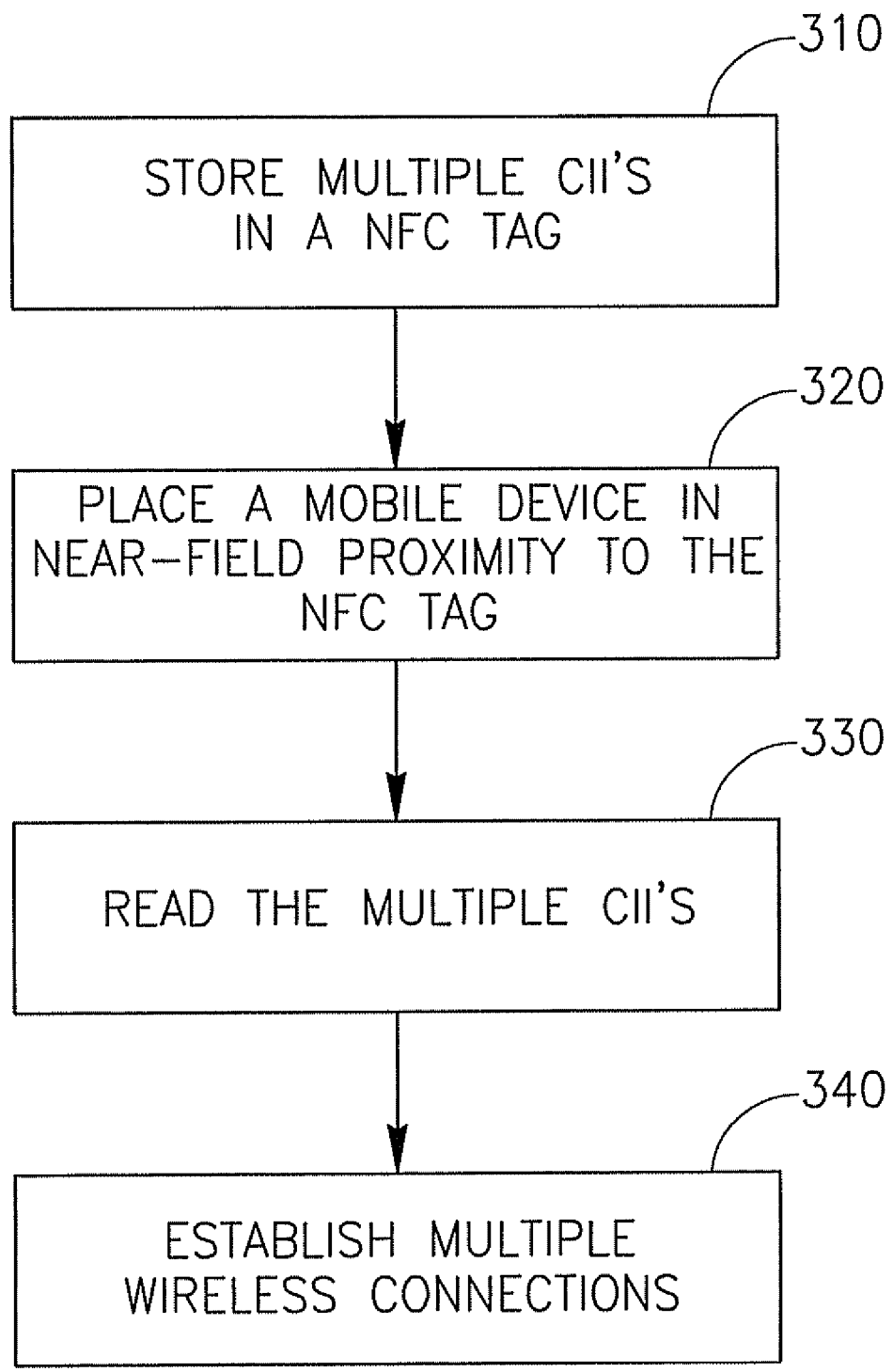
FIG. 3 is a schematic flow-chart of a method of establishing multiple wireless connections in accordance with some demonstrative embodiments of the invention.

FIG. 3 is a schematic flow-chart of a method of establishing multiple wireless connections in accordance with some demonstrative embodiments of the invention. Operations of the method may be used, for example, by system 100 of FIG. 1, by mobile device 110 of FIG. 1, and/or by other suitable devices or systems.

In some embodiments, the method may optionally include, for example, storing multiple CIIs in a NFC tag (block 310). For example, the multiple CIIs indicate to a mobile device how to establish multiple wireless connections with multiple, respective, wireless devices.

In some embodiments, the method may optionally include, for example, placing the mobile device in near-field proximity to the NFC tag (block 320).

In some embodiments, the method may optionally include, for example, reading by the mobile device the multiple CIIs stored in the NFC tag (block 330).

In some embodiments, the method may optionally include, for example, establishing multiple wireless connections between the mobile device and multiple, respective wireless devices, based on the content of the CIIs read by the mobile device from the NFC tag (block 340). Optionally, the mobile device need not be in near-field proximity to the NFC tag during the operation of block 340.

Other operations or sets of operations may be used in accordance with some embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system comprising:

a tag located externally to a mobile device and operative to store wireless connection information readable by the mobile device, the wireless connection information comprising:

a first connection information item including data to support establishment of a first wireless communication link between the mobile device and a first wireless device; and a second connection information item including data to support establishment of a second wireless communication link between the mobile device and a second wireless device, wherein the first wireless device and the second wireless device are located externally to the mobile device and the tag.

2. The system of claim 1, wherein at least one of the first and second connection information items comprises a Media Address Control (MAC) address of the first wireless device.

3. The system of claim 1, wherein at least one of the first and second connection information items comprises an Internet Protocol (IP) address of the first wireless device.

4. The system of claim 1, wherein at least one of the first and second connection information items comprises a Global Unique Identifier (GUID) of the first wireless device.

5. The system of claim 1, wherein the system further comprises the mobile device, and wherein the mobile device comprises a tag reader to read the first and second connection information items upon placement of the mobile device in proximity to the tag.

6. The system of claim 5, wherein the mobile device comprises one or more wireless transceivers to establish the first wireless communication link between the mobile device and the first wireless device based on the first connection information item, and to establish the second wireless communication link between the mobile device and the second wireless device based on the second connection information item.

7. The system of claim 6, wherein the mobile device comprises a tag writer to write into the tag one or more connection information items based on a user-defined platform composition.

8. The system of claim 1, wherein the tag comprises a read/write Near-Field Communication (NFC) tag.

9. The system of claim 1, wherein the tag comprises a read/write Radio Frequency ID (RFID) tag.

10. The system of claim 1, wherein the mobile device comprises a device selected from the group consisting of: a laptop computer, a notebook computer, a tablet computer, a cellular phone, a handheld device, a wireless communication device, a wireless communication station, and a Personal Digital Assistant device.

11. A method comprising:

reading wireless connection information stored in a memory of a tag located externally to a mobile device, the wireless connection information comprising first and second connection information items;

establishing a first wireless communication link between the mobile device and a first wireless device based on data from the first connection information item; and establishing a second wireless communication link between the mobile device and a second wireless device based on data from the second connection information item, wherein the first wireless device and the second wireless device are located externally to the mobile device and the tag.

12. The method of claim 11, wherein the tag comprises a read/write Near-Field Communication (NFC) tag.

13. The method of claim 12, wherein the reading comprises:
- determining that the mobile device is in near-field proximity to the NFC tag.

14. The method of claim 13, comprising:
- in response to the reading, notifying a user of the mobile device that the mobile device is able to wirelessly connect to the first and second wireless devices.

15. The method of claim 14, wherein establishing the first and second wireless communication links comprises:
- establishing the first and second wireless communication links when the mobile device is in near-field proximity to the NFC tag; and
- maintaining the first and second wireless communication links when the NFC tag is not in near-field proximity to the mobile device.

* * * * *